(12) United States Patent
Blakely et al.

(10) Patent No.: US 10,196,022 B1
(45) Date of Patent: Feb. 5, 2019

(54) MAGNETIC BUMPER PLUG

(71) Applicants: Brandon Wayne Blakely, Burlington, NC (US); David Michael Krawiec, Greensboro, NC (US); Zachary Ross Delancey, Reidsville, NC (US)

(72) Inventors: Brandon Wayne Blakely, Burlington, NC (US); David Michael Krawiec, Greensboro, NC (US); Zachary Ross Delancey, Reidsville, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 84 days.

(21) Appl. No.: 15/422,675

(22) Filed: Feb. 2, 2017

(51) Int. Cl.
*B60R 19/02* (2006.01)

(52) U.S. Cl.
CPC .................................. *B60R 19/02* (2013.01)

(58) Field of Classification Search
CPC ............................... B60R 19/02; B60R 13/02
USPC ................................. 293/102, 106, 117, 116
See application file for complete search history.

(56) References Cited

U.S. PATENT DOCUMENTS

| | | | | |
|---|---|---|---|---|
| 4,678,011 A | * | 7/1987 | Weber ..................... | B65D 59/00 138/96 R |
| 4,854,349 A | * | 8/1989 | Foreman ................ | B60R 15/00 137/355.16 |
| 4,979,843 A | * | 12/1990 | Perry ...................... | B60R 19/48 138/89 |
| 5,096,154 A | * | 3/1992 | Ellis ................... | B60K 15/0406 220/230 |
| 6,755,451 B2 | * | 6/2004 | Jones ..................... | B60R 15/00 293/117 |
| D677,203 S | * | 3/2013 | Russell ....................... | D12/100 |
| 8,672,371 B1 | | 3/2014 | Russell et al. | |
| D731,030 S | * | 6/2015 | Tyler ............................. | D23/260 |
| D780,628 S | * | 3/2017 | Peach ........................... | D12/42 |
| 2008/0265229 A1 | * | 10/2008 | DiMartino .............. | E04H 17/20 256/1 |

* cited by examiner

*Primary Examiner* — Jason S Morrow
(74) *Attorney, Agent, or Firm* — Tuggle Duggins P.A.; Blake Hurt

(57) ABSTRACT

A bumper plug for a vehicle having a generally hollow, tubular bumper compartment and a sewer hose having a sewer hose adapter at one end stored within the bumper compartment is provided. The bumper plug includes a body portion and a coupler portion. The coupler portion includes connection member(s) configured for securing the bumper plug to the sewer hose adapter of the sewer hose. The body portion includes attachment member(s) configured for securing the bumper plug on an open end of the bumper compartment. The connection member includes at least one lug disposed on the coupler portion configured for engaging with a bayonet fitting provided on the sewer hose adapter of the sewer hose. The attachment member includes at least one magnet disposed on an inner end of the body portion configured for securing the bumper plug to an open end of the bumper compartment.

19 Claims, 5 Drawing Sheets

MAGNETIC BUMPER PLUG

FIELD OF THE INVENTION

The invention disclosed herein pertains to removable plugs for a generally hollow, tubular bumper compartment of a vehicle. More particularly, the invention pertains to a magnetic bumper plug having a coupler for attachment to a sewer hose adapter of a recreational vehicle (RV). The bumper plug is quickly and easily installed or removed, and remains securely in place while covering the adapter of a sewer hose stored within the bumper compartment.

DESCRIPTION OF THE PRIOR ART AND OBJECTIVES OF THE INVENTION

Large transportation and living vehicles, such as motor homes, buses, recreational vehicles (RVs) and the like, include a variety of storage compartments located inside and outside of the vehicle. One such storage compartment located on the exterior of an RV is a generally hollow, tubular bumper compartment. Oftentimes, a sewer hose for emptying the RV waste water system is stored within the hollow bumper compartment. One end of the sewer hose typically may have an adapter for insertion into a sewer at an RV waste dump station. The other end of the sewer hose typically has an adapter thereon for connecting the sewer hose to the black water waste tank of the RV.

Various types of caps, commonly known as bumper plugs, exist to cover and/or close an open end of a bumper compartment of an RV. The existing bumper plugs may include a handle for grasping a body of plug to insert and remove the plug from the bumper compartment. In addition, the bumper plug may be further provided with structure for ensuring that the plug remains secured on the bumper compartment over time and while the RV is traveling. The bumper plug may close the end of the bumper compartment, or alternatively, may have openings for providing airflow into and out of the bumper compartment to remove moisture and vent odor from the sewer hose. However, the adapter end of the sewer hose may be left uncapped and open. Consequently, any water or waste remaining in the sewer hose after the black water waste tank has been emptied may leak into the bumper compartment and spill onto the ground (or worse) when the bumper plug is removed.

In view of the foregoing, it is apparent that a need exists for an improved apparatus, device, system, assembly and/or method for covering the open end of a generally hollow, tubular bumper compartment. Furthermore, a specific need exists for a bumper plug for magnetic attachment to a bumper compartment of an RV that prevents any residual water or waste remaining in a sewer hose stored within the bumper compartment from leaking into the bumper compartment and/or spilling onto the ground when the bumper plug is removed.

Thus, in response to the problems, disadvantages and deficiencies associated with existing bumper plugs, the present invention was conceived with an objective to provide a bumper plug for attachment to a generally hollow, tubular bumper compartment of an RV that prevents any residual water or waste remaining in a sewer hose stored within the bumper compartment from leaking into the bumper compartment and spilling onto the ground when the bumper plug is removed.

A further objective of the instant invention is to provide a magnetic bumper plug that releasably closes at least one end of a bumper compartment while providing airflow to the interior of the bumper compartment while simultaneously preventing access to the bumper interior by insects, pests, and the like.

Another objective of the present invention is to provide a method for covering an open end of a generally hollow, tubular bumper compartment, while at the same time preventing any residual water or waste in a sewer hose stored within the bumper compartment from leaking and spilling onto the ground when the bumper plug is removed.

An additional objective of the present invention is to provide a bumper plug that engages at least one end of a hose stored within a bumper compartment, and when the bumper plug is removed from the bumper, the hose is readily attached and ready for removal from the bumper compartment without having to search or reach within the bumper compartment to retrieve the hose. Given the potential size of the bumper compartment relative to the hose, and further in view of the contents of the hose and potentially the bumper compartment, the efficiency and hygiene afforded the retrieval of the hose with the disclosed bumper plug is a substantial improvement over the prior art.

Various other objectives and advantages of the present invention will become apparent to those skilled in the art as a more detailed description of one or more exemplary embodiments thereof is set forth below.

SUMMARY OF THE INVENTION

The aforementioned objectives and advantages, as well as other objectives and advantages not expressly set forth herein, are realized by providing a bumper plug for attachment to a bumper compartment of a vehicle, such as a recreational vehicle (RV), according to the present invention. A bumper plug according to the present invention is disclosed by the one or more exemplary embodiments shown and described hereinafter.

In one aspect, the present invention is embodied by a bumper plug for a vehicle having a generally hollow, tubular bumper compartment and a sewer hose having a sewer hose adapter at one end stored within the bumper compartment. The bumper plug includes a body portion and a coupler portion. The coupler portion includes connection members configured for securing the bumper plug to the sewer hose adapter of the sewer hose. In one embodiment, the connection members of the coupler portion of the bumper plug includes at least one lug for engaging with a bayonet fitting provided on the sewer hose adapter.

In another aspect, the present invention is embodied by a bumper plug for a vehicle having a generally hollow, tubular bumper compartment. The bumper plug includes a body portion and a coupler portion. The body portion includes attachment members configured for securing the bumper plug on an open end of the bumper compartment. In one embodiment, the body portion has a recess formed in an outer end thereof that defines a handle for gripping the body portion to insert and remove the bumper plug from the open end of the bumper compartment. In another embodiment, the recess formed in the outer end of the body portion is flanked by sidewalls, such that the recess and the sidewalls together define the handle. The attachment member(s) include at least one magnet disposed on an inner end of the body portion.

In a further aspect, the present invention is embodied by a bumper plug for a vehicle having a generally hollow, tubular bumper compartment. Unlike the prior art devices, which require insertion and/or compression of a portion of the plug into the bumper compartment to effect a frictional engagement between the plug portion and the bumper compartment, the present bumper plug relies on magnetic attachment to an outwardly oriented surface of the bumper. This securing method is advantageous over the prior art, which tends to bias the cap (or "creep") out of position over time, particularly if they are made from plastic.

In yet another aspect, the present invention is embodied by a method of capping a sewer hose adapter on a sewer hose and attaching a bumper plug to an open end of a bumper compartment on a vehicle. The method includes providing a bumper plug including a body portion and a coupler portion. The coupler portion has connection members operable for securing the bumper plug to the sewer hose adapter. The body portion has attachment members for securing the bumper plug to the open end of the bumper compartment. The method further includes securing the coupler portion of the bumper plug to the sewer hose adapter using the connection members. The method further includes inserting the bumper plug into the open end of the bumper compartment and securing the body portion of the bumper plug to the open end of the bumper compartment using the attachment members. In one embodiment, the connection members of the coupler portion includes at least one lug configured for engaging with a bayonet fitting provided on the sewer hose adapter of the sewer hose. In another embodiment, the attachment member of the body portion includes at least one magnet disposed on an inner end of the body portion configured for engaging with the open end of the bumper compartment. In yet another embodiment, the body portion further includes a handle configured for gripping the bumper plug when the bumper plug is inserted into the bumper compartment and removed from the bumper compartment.

BRIEF DESCRIPTION OF THE DRAWINGS

The aforementioned aspects, objects, features, advantages and exemplary embodiments of the present invention will be more fully understood and appreciated by those skilled in the art when considered in conjunction with the accompanying drawing figures, in which like reference characters designate the same or similar parts throughout the several views.

DETAILED DESCRIPTION OF EXEMPLARY EMBODIMENTS AND OPERATION OF THE INVENTION

Figure 1:
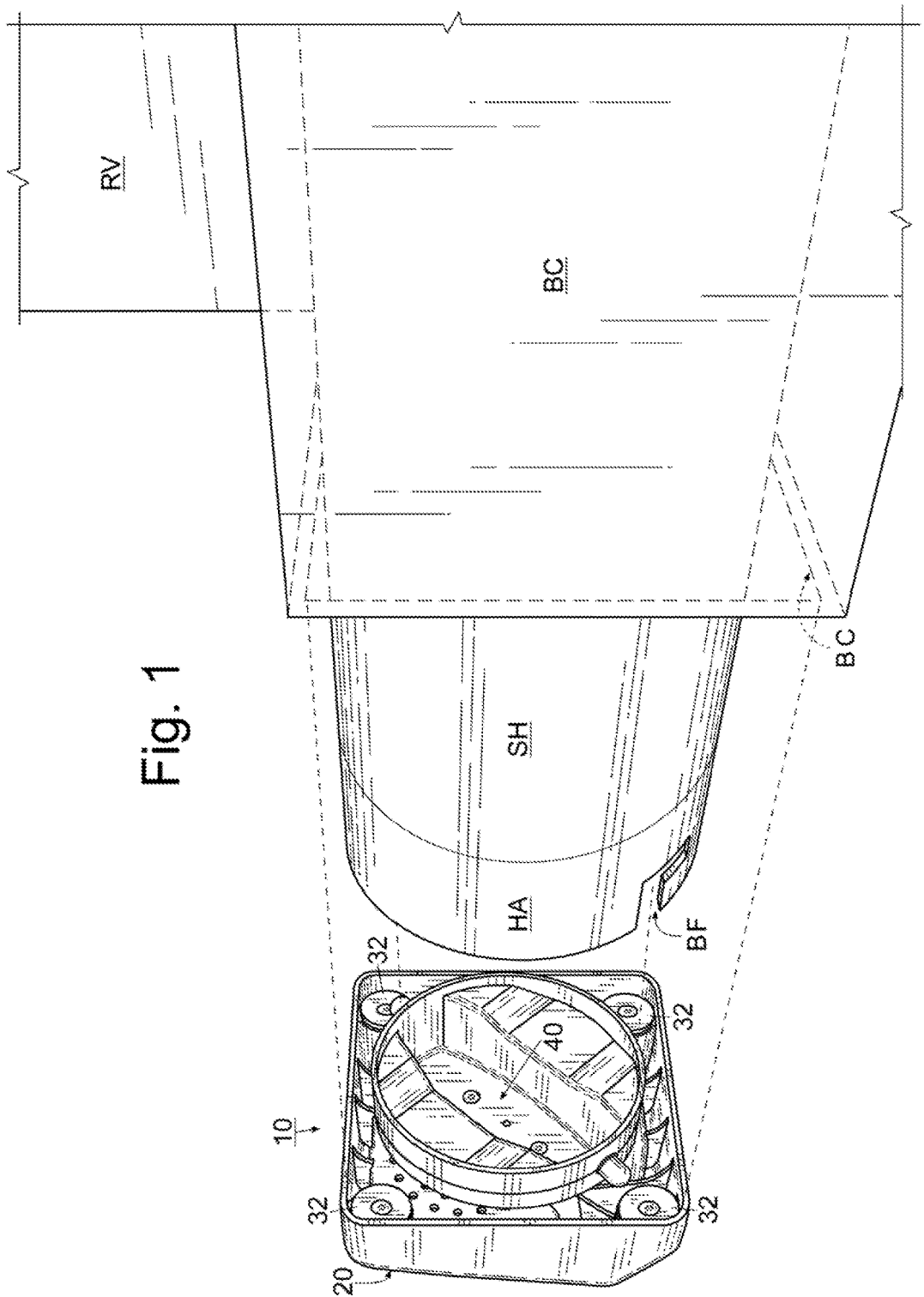
FIG. 1 is an environmental perspective view illustrating a bumper plug having a coupler for a sewer hose adapter according to the present invention positioned for connection to the sewer hose adapter and attachment to a bumper compartment.

For a better understanding of the present invention and its operation, turning now to the drawing figures, FIG. 1 is an environmental perspective view illustrating a bumper plug, indicated generally by reference character 10, according to the present invention. The bumper plug 10 has a body portion 20 and a coupler portion 40 for connecting the bumper plug to a sewer hose adapter HA on an end of a sewer hose SH for a recreational vehicle (RV). While the sewer hose adapter HA portion is described herein as a separate component of sewer hose SH as is known in the art, nothing in the present disclosure should be construed as a restriction on the use of bumper plug 10 in combination with embodiments of sewer hose that integrally incorporate the structure of sewer hose adapter HA as disclosed herein (for example, see co-pending U.S. patent application Ser. No. 15/200,487). The sewer hose SH is used to empty and/or flush the black water waste tank (not shown) of the RV into, for example, a sewer at an RV waste dump station. Often times, the sewer hose SH is stored after use within a generally hollow, tubular bumper compartment BC provided on the rear of the RV (demonstrated with dotted lines and referenced as BC in FIG. 1). Consequently, residual waste remaining in the sewer hose SH has a tendency to leak into the bumper compartment BC and out of the bumper compartment BC when a conventional bumper plug is removed from the bumper compartment BC. A bumper plug 10 constructed according to the present invention is intended to cover, or cap, the open end of the sewer hose adapter HA, thereby blocking off at least one end of the sewer hose SH.

As shown and described herein, the bumper plug 10 is configured to connect to a sewer hose adapter HA on a sewer hose SH stored within a bumper compartment BC of an RV. However, it is not intended by this disclosure of exemplary embodiments to limit the configuration of the bumper plug 10 to the particular embodiments shown and described herein. Instead, it is expected that those of ordinary skill in the art will readily understand and appreciate that a bumper plug 10 according to the present invention may be constructed of various different materials in various different configurations and in various ways without departing from the general concepts and objectives of the present invention in any meaningful manner. As such, the scope of the present invention should be broadly construed in light of this disclosure and limited only by the appended claims.

As previously mentioned, FIG. 1 shows a bumper plug 10 constructed in accordance with the present invention positioned adjacent an open end of a generally hollow, tubular bumper compartment BC of an RV. The bumper compartment BC defines an interior compartment for storing a variety of components, attachments and the like for the RV. In particular, a sewer hose SH used to empty the black water waste tank of the RV may be stored within the bumper compartment BC in a known manner. The sewer hose SH has a sewer hose adapter HA at one end for connecting the sewer hose SH to the black water waste tank of the RV. The sewer hose adapter HA is preferably provided with a bayonet fitting BF for readily making a connection to a coupler provided on a discharge tube or conduit from the black water waste tank. As will be described in greater detail hereinafter, the bumper plug 10 is configured for connection to the sewer hose adapter HA on the sewer hose SH, and subsequently, for attachment to the open end of the bumper compartment BC of the RV.

Figure 2:
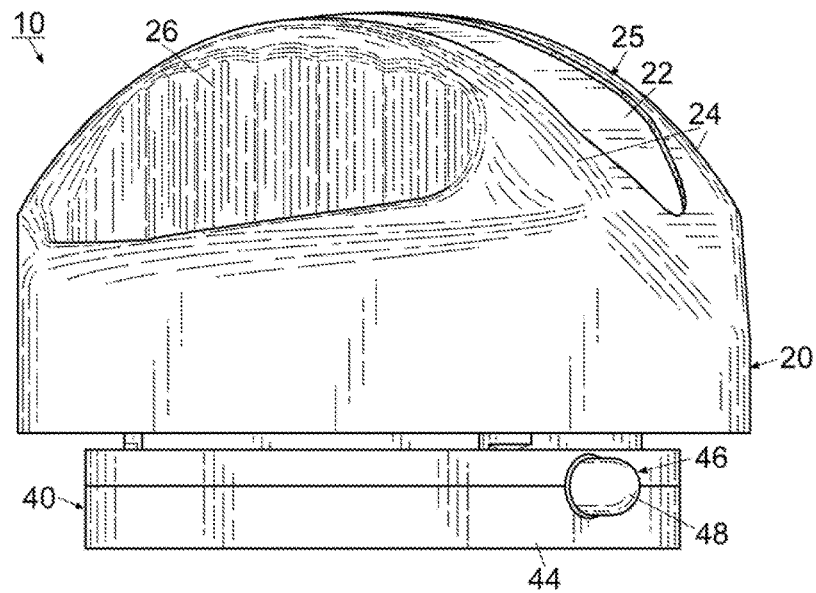
FIG. 2 is an elevational view of the bumper plug according to an exemplary embodiment of the present invention looking in a side direction.
Figure 3:
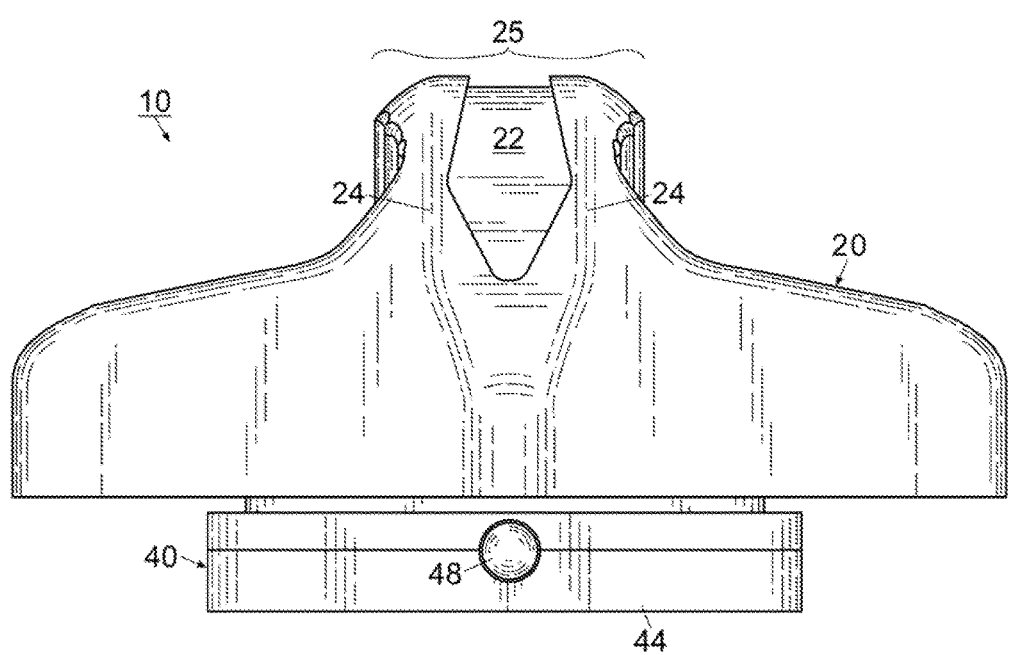
FIG. 3 is an elevational view of the bumper plug shown in FIG. 2 looking in a diagonal direction.
Figure 4:
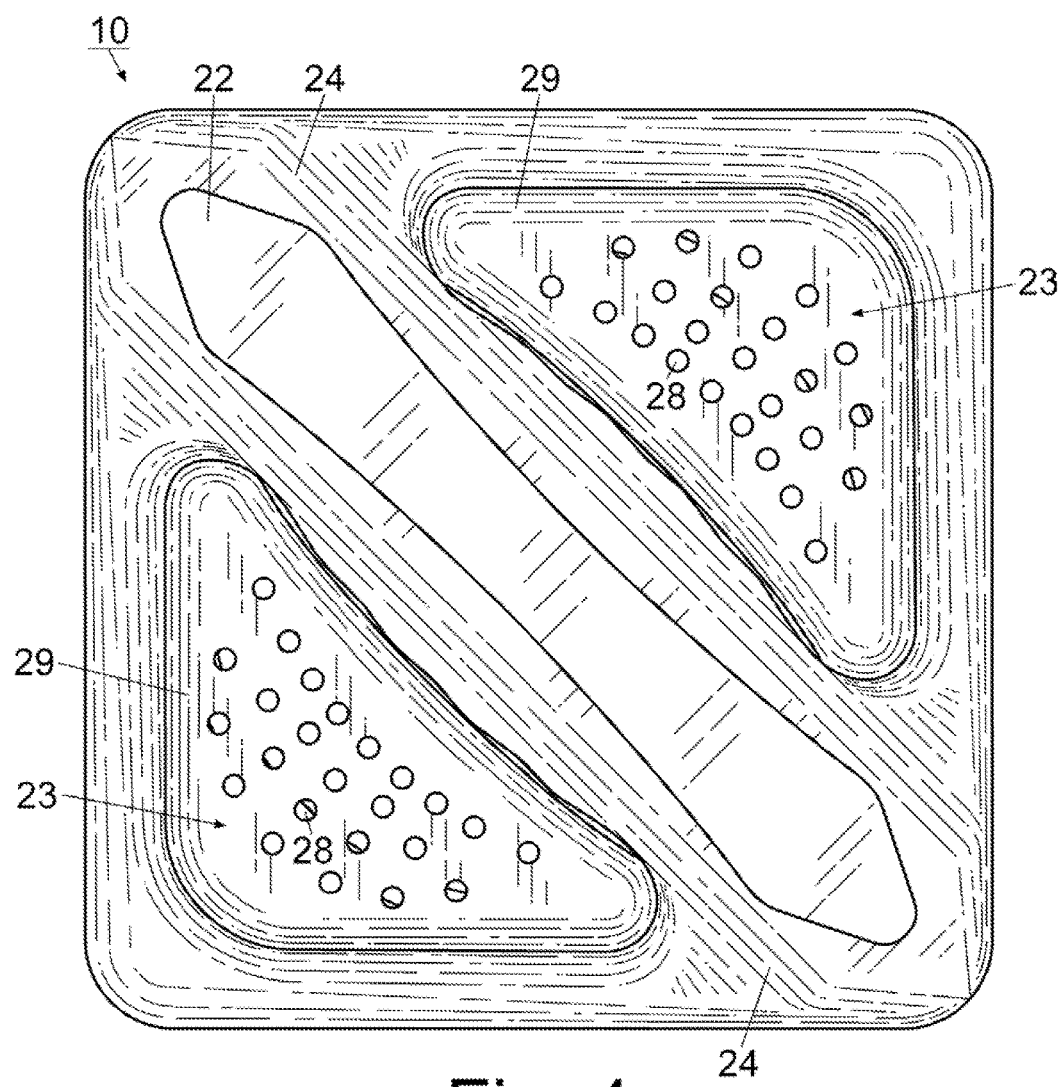
FIG. 4 is a top plan view of the bumper plug shown in FIG. 2.
Figure 5:
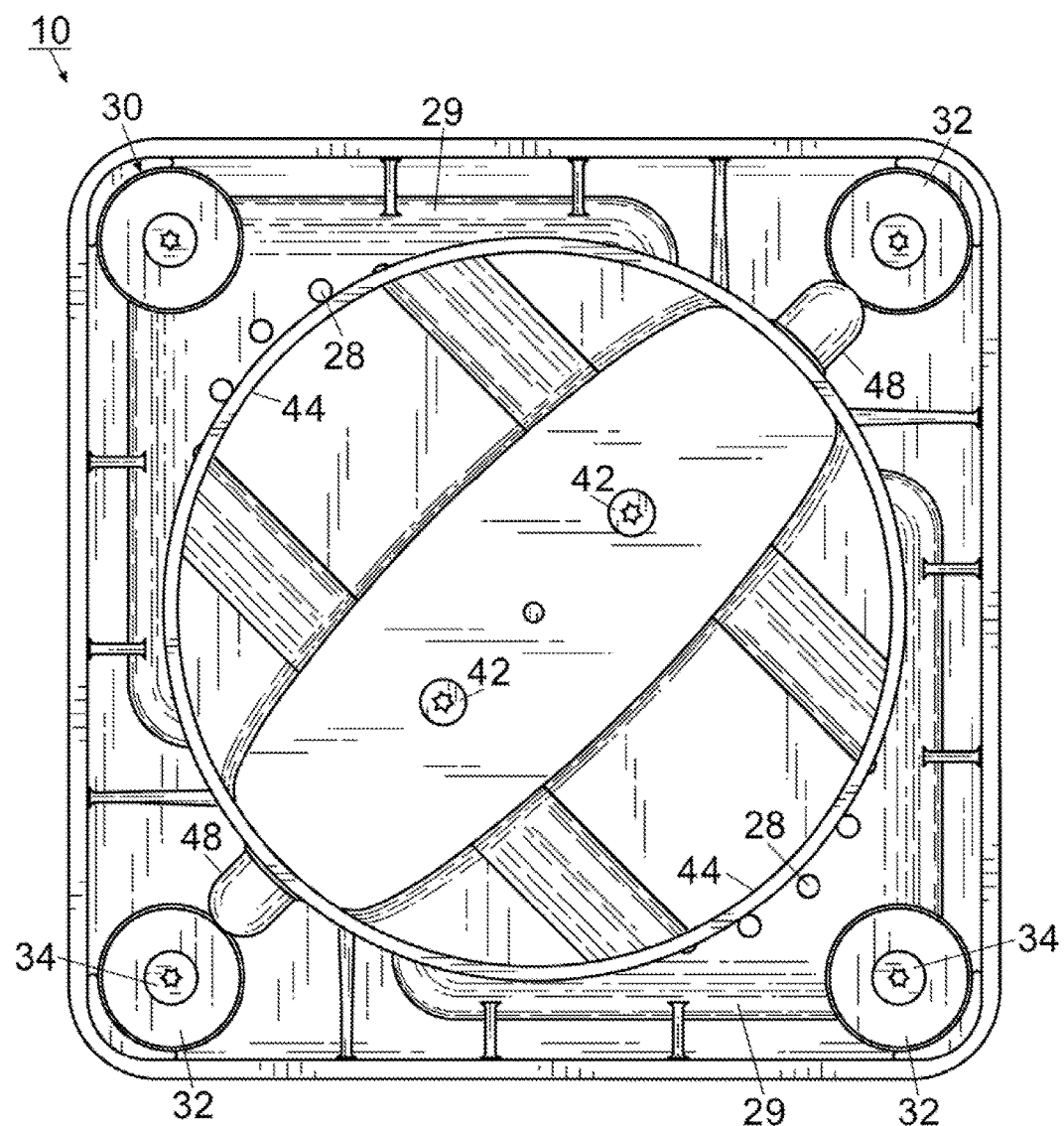
FIG. 5 is a bottom plan view of the bumper plug shown in FIG. 2.

FIG. 2 is an elevational side view of the bumper plug 10 looking in a first side direction. FIG. 3 is an elevational side view of the bumper plug 10 looking in a second side direction. As would be understood, the opposing sides relative to the first and second sides are identical in all respects to the illustrated sides, and thus are not reproduced herein. FIG. 4 is a top plan view of the bumper plug 10. FIG. 5 is a bottom plan view of the bumper plug 10. The bumper plug 10 may be made of any formable material having suitable strength and water, weather, and ultraviolet (UV) radiation resistance for use in an outdoor environment. By way of example and not limitation, the bumper plug 10 may be formed of metal, plastic, composite material, or a combination thereof. In an advantageous embodiment, the bumper plug 10 is formed of a high strength plastic, such as injection moldable or compression moldable polyethylene, polycarbonate, polypropylene, polyurethane, or polyvinyl chloride (PVC) material.

As best shown in FIG. 2 and FIG. 3, the bumper plug 10 comprises a body portion, or body 20 and a coupler portion, or coupler 40. The body portion 20 and the coupler portion 40 may be integrally formed together, or may be individually formed and subsequently joined together using a conventional process, such as adhesion, fusion, fasteners, or the like. Alternatively, the body portion 20 may be provided with a cavity configured (i.e. sized and shaped) to receive the coupler portion 40 therein, and the body portion 20 and the coupler portion 40 may be press fit together. In the latter embodiment, the body portion 20 and the coupler portion 40 may be made of dissimilar materials. By way of example only and not limitation, the body portion 20 may be made of a plastic material and the coupler portion 40 may be made of a metal material, or alternatively, the body portion made of metal and the coupler portion made of plastic. In the preferred embodiment, body 20 and coupler 40 are formed from the same material, but dyed different colors for ease of use.

If desired, the body portion 20 may be generally domeshaped for aesthetics, ergonomics, and/or purposes of minimizing wind resistance. Regardless, the body portion 20 has a central opening, cavity or recess 22 formed on an outer surface thereof. The recess 22 is flanked by sidewalls 24, such that the recess 22 and the sidewalls 24 together define a handle 25 for gripping the bumper plug 10. To allow for better grasping of handle 25, body portion 20 further defines triangularly shaped cavities 23 formed on either side of handle 25 having respective inner body walls adjacent to handle 25. For structural integrity a plurality of ribs may be formed on the bottom or inner end of body portion 20 between the outer walls of body portion 20 and the outer walls of cavities 23, as well as between cavities 23 themselves and the entirety of the inner walls of handle 25 for added strength and durability of handle 25, and may be joined to coupler 40 depending upon formation configurations of bumper plug 10 as described herein. Handle 25 is configured (i.e. sized and shaped) to facilitate attaching the bumper plug 10 to the sewer hose adapter HA, as well as subsequently attaching the bumper plug 10 to the open end of the bumper compartment BC and removing the bumper plug 10 from the bumper compartment BC and subsequent removal from the sewer hose adapter HA, as will be described. If desired, the handle 25 may be provided with a series of ridges 26 designed for improving the tactility of the handle 25 of the bumper plug 10.

As best shown in FIG. 4 and FIG. 5, cavities 23 of the body portion 20 further include a plurality of smaller openings 28 formed therethrough from a top or outer end to a bottom or inner end, thereof. The openings 28 provide for air flow through the bumper plug 10 to promote evaporation of any residual liquid within the sewer hose SH and/or the bumper compartment BC, to vent odor from within the sewer hose SH and/or the bumper compartment BC to the outside ambient environment, and to prevent pests from accessing the interior of bumper compartment BC (see for example, U.S. Pat. No. 8,672,371, owned by the instant applicant and incorporated in its respective entirety herein). In addition, one or more seals 29 may be provided on the bottom, or inner end, of the bumper plug 10.

The bumper plug 10 further comprises one or more attachment members 30 operable for attaching the bumper plug 10 to the opened end of the bumper compartment BC. The attachment members 30 of the bumper plug 10 may be any suitable means for securing the bumper plug 10 to the bumper compartment BC, especially while the RV is being moved or is traveling from one location to another. In the exemplary embodiments shown and described herein, the attachment members 30 comprise a plurality of magnets 32 disposed on the bottom, or inner end, of the bumper plug 10. The magnets 32 are mounted on the body portion 20 in a suitable manner, for example by adhesion, fusion, welding, fasteners or the like. As shown herein, each magnet 32 comprises a generally annular disc made of a ferromagnetic material having a central opening for receiving a threaded fastener 34 to secure the magnet to the body portion 20 within a corresponding tapped opening formed in a column adjacent each respective corner in the bottom, or inner end, of the bumper plug 10.

Figure 6:
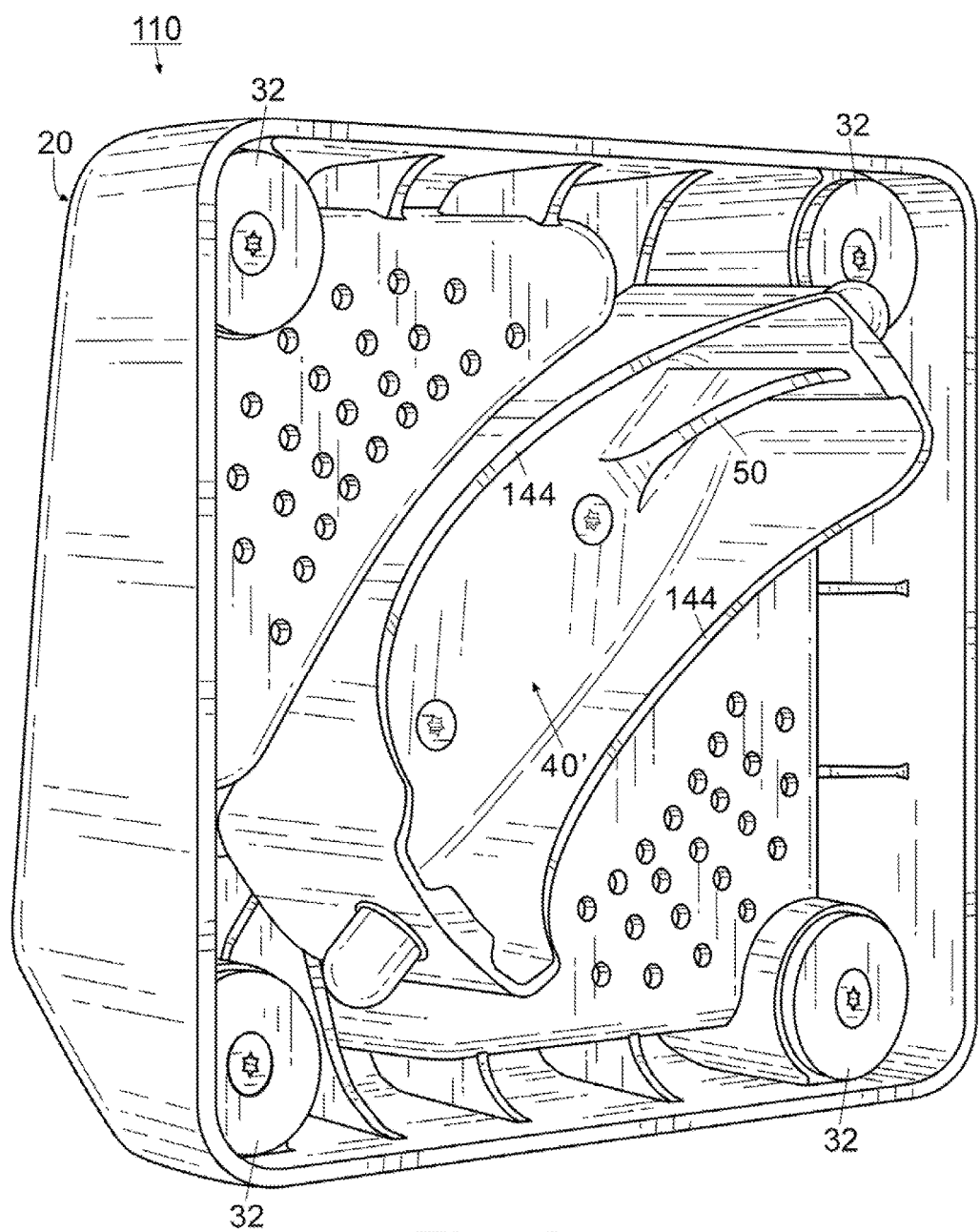
FIG. 6 is a perspective view illustrating an alternate bumper plug having a coupler for attachment to a sewer hose adapter.

The coupler portion 40 of the bumper plug 10 preferably defines a generally circular or annular shape with a substantially hollow interior opening and a dorsal rib sized and shaped to be received within a corresponding cavity defined within body portion 20 on the bottom, or inner end, of the bumper plug 10. In embodiments whereby body portion 20 and the coupler portion 40 are individually formed, as opposed to integrally formed, the coupler portion 40 may be secured to the body portion 20 in a suitable manner, such as adhesion, fusion, welding, fasteners or the like. As shown herein, the coupler portion 40 is secured to the body portion 20 by one or more threaded fasteners 42 received within corresponding openings formed in the bottom, or inner end, of the bumper plug 10. An alternate embodiment of coupler portion 40' as shown in FIG. 6 on coupler 110 may define a more arcuate shape depending downwardly from body portion 20 and may include legs 144 that depend outwardly from the body portion 20 on the bottom, or inner end, of the bumper plug 10. Coupler portion 40 further comprises connection members 46 operable for engaging within one or more channels, holes, openings, or the like provided on the sewer hose adapter HA. Connection members 46 may be any suitable structure adapted for linking the bumper plug 10 and the sewer hose SH when the coupler portion 40 of the bumper plug 10 engages with the bayonet fitting BF of the sewer hose adapter HA. In the exemplary embodiments shown and described herein, the connection members 46 consist of at least one, and preferably at least a pair, of lugs 48 disposed on and depending outwardly from the exterior circumferential surface 44 of the coupler portion 40. Lugs 48 are configured (i.e. sized and shaped) to be received within opening such as the bayonet fitting BF on the sewer hose adapter HA. As such, lugs 48 are preferably generally cylindrical, or rod-shaped, and are formed from a suitable inelastic material, such as stiff plastic, metal, composite or combinations thereof. If desired, coupler portion 40 may also be provided with one or more reinforcing ribs 50 (FIG. 6) configured for supporting and stiffening the lugs 48 during insertion of the coupler portion 40 of the bumper plug 10 into the sewer hose adapter HA on the end of the sewer hose SH.

The present invention also pertains to a method for capping, the open end of a sewer hose SH stored within a bumper compartment BC of an RV, and/or closing the open end of the bumper compartment BC. In an exemplary embodiment, the method comprises providing a bumper plug 10 configured for connection to a sewer hose adapter HA of a sewer hose SH stored within a bumper compartment BC of an RV, and/or for attachment to an open end of the bumper compartment BC, wherein the bumper plug 10 comprises a body portion 20 defining a handle 25 adapted for gripping the bumper plug 10 and attachment means 30 operable for attaching the bumper plug 10 to the bumper compartment BC, and wherein the bumper plug 10 further comprises a coupler portion 40 having connection members 46 operable for engaging the sewer hose adapter HA of the sewer hose SH. The method further comprises connecting the bumper plug 10 to the sewer hose adapter HA by insertion of the lugs 48 of the connection members 46 within the openings of the bayonet fittings BF of the hose adapter HA and thereafter rotating the bumper plug 10 to lock the lugs 48 within the bayonet fittings BF. The method further comprises attaching the bumper plug 10 to the bumper compartment BC by pushing the bumper plug 10 and attached sewer hose SH toward the bumper compartment BC whereby the outer walls of the body portion 20 of the bumper plug 10, which extend outwardly past attachment members 30, slide overtop the outer edge of the bumper compartment BC whereby magnets 32 of attachment members 30 abut and affix to the end of bumper compartment BC. The slight overlapping of the outer walls of body portion 20 and the magnetic force of magnets 32 affixed to bumper compartment BC coupled with the connection of coupler 40 with sewer hose SH maintain bumper plug 10 in position and further assist in preventing inadvertent removal or displacement of bumper plug 10 when in use such as during travel, storage, and adverse weather conditions. It should be understood that while the instant method contemplates utilization of the lug and bayonet fitting mechanism, other engagement methods, such as insertion of lugs 48 into or out of loose-fitting apertures are also within the scope of the instant disclosure.

In one embodiment, the connection members 46 of the coupler portion 40 of the bumper plug 10 comprises at least one, and preferably a pair, of lugs 48 disposed on and depending outwardly from the coupler portion 40. The lugs 48 are operable for engaging with a channel defined in bayonet fitting BF provided on the sewer hose adapter HA to secure the sewer hose SH onto the bumper plug 10. In another embodiment, the attachment member 30 comprises at least one, and preferably a plurality, of magnets 32 disposed on the body portion 20 of the bumper plug 10. The magnets 32 are operable for engaging with the bumper compartment BC to secure the bumper plug 10 onto the open end of the bumper compartment BC.

The foregoing description of exemplary embodiments of the present invention discloses a novel, non-obvious and useful bumper plug configured for connection to a sewer hose adapter and/or for attachment to an open end of a generally hollow, tubular bumper compartment. However, it should be noted and will be readily apparent to, understood and appreciated by those skilled in the art that the drawings, figures, illustrations, examples and exemplary embodiments provided herein are for the purpose of providing a complete, accurate and enabling disclosure of the present invention only and are not intended to limit the scope of the appended claims in any manner. As such, it is envisioned that other structures, mechanisms, configurations, components and movements may be utilized to accomplish the same or similar functions with the same or similar results without departing from the intended scope of the appended claims.

We claim:

1. A bumper plug for a bumper compartment with a sewer hose stored within the bumper compartment, the bumper plug comprising:
    a body portion; and
    a coupler portion including a connection member, the connection member configured for securing the bumper plug to an end of a sewer hose, wherein the connection member of the coupler portion of the bumper plug comprises at least one lug, the lug extending generally perpendicularly relative to the coupler portion for engaging with a channel defined by the sewer hose.

2. The bumper plug of claim 1, wherein the coupler portion comprises an exterior surface extending depending from an inner end of the body portion, and wherein the at least one lug depends perpendicularly relative to the exterior surface.

3. The bumper plug of claim 1, wherein the coupler portion comprises an exterior circumferential surface that depend from the body portion, and wherein a pair of lugs depend from the exterior surface to engage with the sewer hose.

4. The bumper plug of claim 3, wherein the lugs are opposingly disposed on the exterior circumferential surface and each lug depends perpendicularly therefrom.

5. The bumper plug of claim 1, wherein the coupler portion is integrally formed with the body portion.

6. The bumper plug of claim 1, wherein the coupler portion is attached to the body portion by at least one fastener.

7. The bumper plug of claim 1, wherein at least one of the body portion and the coupler portion is formed of a polymeric material.

8. The bumper plug of claim 1, wherein the body portion comprises a magnetic attachment member configured for securing the bumper plug on an end of the bumper compartment.

9. The bumper plug of claim 3, wherein the coupler portion defines one or more reinforcing ribs configured for supporting and stiffening the pair of lugs when the coupler portion is inserted into the end of the sewer hose.

10. A bumper plug for a vehicle defining a tubular compartment, the bumper plug comprising:
    a body portion including a magnetic attachment member, the magnetic attachment member for securing the bumper plug on an open end of the bumper compartment; and
    a coupler portion including a connection member, the connection member configured for securing the bumper plug to an end of a sewer hose.

11. The bumper plug of claim 1, wherein the body portion defines a recess formed in an outer end thereof that forms a handle for gripping the body portion to insert the bumper plug into the tubular compartment and to remove the bumper plug from the open end of the tubular compartment.

12. The bumper plug of claim 11, wherein the recess formed in the outer end of the body portion is flanked by sidewalls, such that the recess and the sidewalls together define the handle.

13. The bumper plug of claim 10, wherein the body portion further has a plurality of openings formed therethrough for providing airflow when the bumper plug is attached to the open end of the bumper compartment.

14. The bumper plug of claim 10, wherein the magnetic attachment member is defined as at least one magnet disposed on an inner end of the body portion.

15. The bumper plug of claim 14, wherein the magnetic attachment member is defined as a plurality of magnets disposed on the inner end of the body portion, and wherein each of the magnets is secured to the body portion by at least one fastener.

16. A method of capping a sewer hose and attaching a bumper plug to an open end of a bumper compartment on a vehicle, the method comprising:
   providing a bumper plug comprising a body portion and a coupler portion, the coupler portion having a connection member operable for securing the bumper plug to the sewer hose, the body portion having an attachment member for securing the bumper plug to the open end of the bumper compartment;
   engaging the coupler portion of the bumper plug to the sewer hose via the connection member;
   inserting the bumper plug into the open end of the bumper compartment; and
   securing the body portion of the bumper plug to the open end of the bumper compartment via the attachment member.

17. The method of claim 16, wherein the connection member of the coupler portion comprises at least one lug configured for engaging with a bayonet fitting provided on the sewer hose.

18. The method of claim 16, wherein the attachment member of the body portion comprises at least one magnet disposed on an inner end of the body portion configured for engaging with the open end of the bumper compartment.

19. The method of claim 16, wherein the body portion further comprises a handle configured for gripping the bumper plug when the bumper plug is inserted into the bumper compartment and removed from the bumper compartment.

* * * * *